Figures 1, 2, 3:
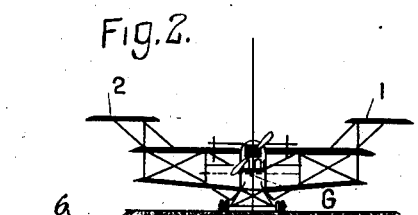

Nov. 16, 1926.  
A. TAMMÉO  
1,607,577  
AEROPLANE  
Filed April 20, 1925

Inventor  
ALDO TAMMÉO

By

Attorney

Patented Nov. 16, 1926.

1,607,577

UNITED STATES PATENT OFFICE.

ALDO TAMMÉO, OF GENOA, ITALY, ASSIGNOR OF FOUR-TENTHS TO ALDO TAMMÉO, FOUR-TENTHS TO EUGENIO CAMINADA, ONE-TENTH TO PIETRO FOPPIANO, AND ONE-TENTH TO CARLO SCOTTI, ALL OF GENOA, ITALY.

AEROPLANE.

Application filed April 20, 1925, Serial No. 24,553, and in Italy June 30, 1924.

This invention relates to improvements in aeroplanes and has for its object to improve the stability both about their rolling axis and about their pitching axis.

The main principles upon which this invention is based are so to arrange the planes that:

(1) Any rotation of the aeroplane about its rolling axis will automatically set up a dynamical braking action which is capable of neutralizing said rotation.

(2) Any rotation of the aeroplane about its pitching axis will automatically set up a dynamical braking action which is capable of neutralizing said rotation.

(3) Any flight of the aeroplane in a condition out of equilibrium (such as would finally result from its rotation around the pitching axis) will automatically set up a statical righting torque around said axis so as to restore the aeroplane to a condition of equilibrium.

According to this invention, there is provided at the symmetrical ends of the main supporting wings of the aeroplane a pair of horizontal plane surfaces so shaped as to extend rearwards and be of considerable size and such that their relative centres of pressure will respectively be at two exactly symmetrical points considerably in rear of and above the pitching axis.

The two surfaces, which will henceforth be termed "horizontal stabilizing planes" will set up a strong dynamical braking action to any rotation of the aeroplane over its rolling axis because the thrusts exerted by the wind on the stabilizing planes will, as they are proportional to the area of the planes, be relatively strong, while as the said thrusts are applied to their centres of pressure they will have a considerable leverage with respect to the centre of gravity of the aeroplane, and finally because the said two thrusts are so directed as to set up a braking torque.

The longitudinal elongated shape of the said horizontal stabilizing planes has for effect that the relative centres of pressure will be behind the transverse pitching axis, and will thus also provide for a considerable dynamical braking action against any pitching of the aeroplane.

In addition to the above mentioned braking actions, against both rolling and pitching oscillations, the horizontal stabilizing planes will also provide for a strong statical equilibrating action about the pitching axis.

In fact, as soon as the aeroplane comes out of equilibrium, the stabilizing planes will provide a projection at right angles to the translational displacement of the aeroplane and the latter displacement, independently of the operation of the engines, will set up a pressure over the said planes; as the forces so produced are applied to their centres of pressure and these are behind the pitching axis, a statical righting torque will be set up about the said axis.

The provision of stabilizing planes prevents any oscillation from taking place both about the rolling and the pitching axes and moreover if required brings the aeroplane back into a position of equilibrium with respect to the pitching axis.

While the provision of automatic stabilizing means is usually advantageous for civil flying circumstances may arise where this would not be the case, and moreover for military flying it would certainly be necessary to provide a way of rapidly varying the position of the aeroplane either about its pitching axis or about its rolling axis.

A further feature of this invention therefore is the varying of the stabilizing action of the said planes, which is effected by dividing up each stabilizing plane into a rigid portion and a portion rotatable about a predetermined axis; in the preferred embodiment the movable portion is in front, and therefore by inversely rotating the said front portions of the stabilizing planes it will be possible to reduce and graduate their stabilizing action around the rolling axis, while, by suitably simultaneously varying in the same sense the inclination of said front portions with respect to the rigid portions it will be possible to reduce, vary or graduate the statical balancing action about the pitching axis.

Figure 6:
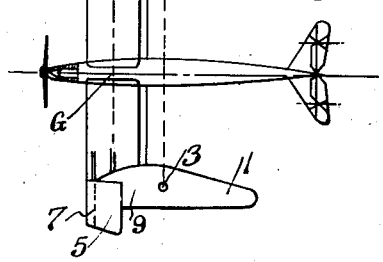
Figures 4, 7:
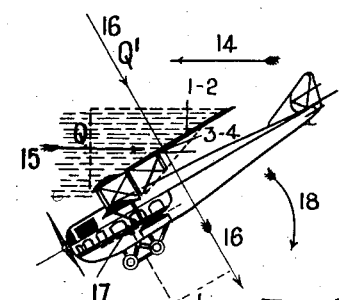
Figures 5, 8:
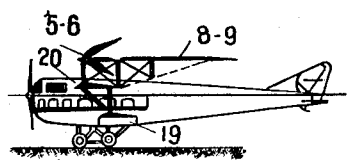

The invention is illustrated in the accompanying drawing, in which Figures 1, 2 and 3, are respectively a plan, a front elevation and a side elevation of an aeroplane in a position of equilibrium, constructed in accordance with this invention. Figure 4 shows the dynamical braking action of the stabilizing planes against rotation of the aeroplane about the rolling axis; Figure 5 shows the dynamical braking action of the stabilizing planes against rotation about the pitching axis; Figure 6 shows the statical righting action about the pitching axis, when the aeroplane is travelling out of equilibrium; while Figures 7 and 8 show stabilizing planes in which the front portion is movable and independent of the remaining rigid portion thereof.

Referring to the drawing, 1 and 2 are stabilizing planes, 3 and 4 being respectively their centres of pressure, which, as seen from Figure 4, are at a distance $2l$ from each other and at an equal distance $l$ from the centre of gravity; the planes 1 and 2 include front portions 5 and 6 so rotatable about the axis 7—7 that they can be inclined with respect to the remaining fixed portions 8 and 9 of the said planes.

Should an aeroplane for any reason have a tendency to roll in the direction of the arrow 10, Figure 4, two forces 11 will be set up, applied respectively to the points 3 and 4 (i. e. at a large distance apart) in opposite directions whereby rotation about the rolling axis is braked.

Should the aeroplane for any reason have a tendency to pitch in the direction of the arrow 12, Figure 5, at the points 3 and 4—being the centres of pressure—a force 13 is applied at the centres of pressure 3 and 4 of the planes 1 and 2; these pressures act with considerable leverage $l_1$ with respect to the centre of gravity 17, thus braking any movement in the direction of the arrow 12.

Should finally the aeroplane, for any specific reason, come into the position shown in Figure 6 and become displaced in the direction of arrow 14, a force 15 will be set up at the centres of pressure 3 and 4 of the planes 1 and 2, the component 16 of which, acting with a leverage $l^2$ with respect to the centre of gravity 17, will impart to the aeroplane a rotation in the direction of arrow 18, thus restoring it to a position of equilibrium.

Referring particularly to Figures 7 and 8, it will be seen that by altering the inclination of the front portions 5 and 6 with respect to the rear portions 8 and 9 of the said stabilizing planes, it is possible to displace the resultant centre of pressure of each stabilizing plane (comprising movable and rigid portions) whereby the equilibrating action previously considered can be varied and controlled.

Many modifications may be made in the solution of the problem without departing from the scope of the invention, for example, besides making the end portions 5 and 6 of the stabilizing planes movable, the lower plane 19 of the supporting wings may also be movable, while keeping the thick wing 20 fixed: the control devices of the said other movable wings being arranged within the wing 20.

What I claim as my invention is:

1. In an aeroplane, the combination with the main supporting wings, of a pair of backwardly extending horizontal planes such that their centres of pressure are at two symmetrical points in rear of the pitching axis, the said planes each comprising a fixed portion and a portion rotatable about an axis substantially parallel to the pitching axis, in combination with a lower wing of variable incidence.

2. In an aeroplane, the combination with the main supporting wings, of a pair of backwardly extending horizontal planes such that their centres of pressure are at two symmetrical points above the pitching axis and at a considerable distance from the rolling axis, the said planes each comprising a fixed portion and a portion rotatable about an axis substantially parallel to the pitching axis, in combination with a lower wing of variable incidence.

In witness whereof, I have hereunto signed my name.

ALDO TAMMEO.